(12) United States Patent
Wolfson et al.

(10) Patent No.: US 11,290,492 B2
(45) Date of Patent: Mar. 29, 2022

(54) MALICIOUS DATA MANIPULATION DETECTION USING MARKERS AND THE DATA PROTECTION LAYER

(71) Applicant: EMC IP Holding Company LLC, Hopkinton, MA (US)

(72) Inventors: Kfir Wolfson, Beer Sheva (IL); Udi Shemer, Kfar Saba (IL); Amos Zamir, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 340 days.

(21) Appl. No.: 16/395,847

(22) Filed: Apr. 26, 2019

(65) Prior Publication Data

US 2020/0344264 A1    Oct. 29, 2020

(51) Int. Cl.
*H04L 29/06*    (2006.01)

(52) U.S. Cl.
CPC .......... *H04L 63/20* (2013.01); *H04L 63/1491* (2013.01)

(58) Field of Classification Search
CPC ................ H04L 63/20; H04L 63/1491; H04L 2463/146
See application file for complete search history.

(56) References Cited

U.S. PATENT DOCUMENTS

| 10,379,995 B1* | 8/2019 | Walters ................... G06F 9/541 |
| 2018/0198801 A1* | 7/2018 | Gopalakrishna ...... H04L 63/145 |
| 2020/0099721 A1* | 3/2020 | Golan ................... H04L 63/145 |

* cited by examiner

*Primary Examiner* — Joseph P Hirl
*Assistant Examiner* — Thomas A Gyorfi
(74) *Attorney, Agent, or Firm* — Staniford Tomita LLP

(57) ABSTRACT

Embodiments for detecting malicious modification of data in a network, by: setting, by a first layer of network resources, a number of markers associated with input/output (I/O) operations of the network; saving the markers, location, and associated metadata in a marker database; reading, by a second layer of the network resources, the markers corresponding to relevant I/O operations; and verifying each scanned I/O operation against a corresponding marker to determine whether or not data for a scanned specific I/O operation has been improperly modified for the first and second layers and any intermediate layer resulting in a fault condition, and if so, taking remedial action to flag or abort the specific I/O operation.

20 Claims, 7 Drawing Sheets

MALICIOUS DATA MANIPULATION DETECTION USING MARKERS AND THE DATA PROTECTION LAYER

TECHNICAL FIELD

Embodiments are generally directed to data security, and more specifically to using markers and the data protection layer to prevent malicious data manipulation.

BACKGROUND

Both large and small-scale enterprises invest time and money into securing private information, but all too often, the focus is on preventing hackers from accessing data by trying to ensure that sensitive information, trade secrets, and personal data remain confidential. While data leakage can cause damage, data integrity attacks can be just as dangerous. This kind of attack has a lower profile and is much more difficult to detect, though the financial damage could be substantial.

Maintaining data integrity requires keeping the data uncorrupted and accessible only by those authorized to do so. It involves maintaining the consistency, accuracy and trustworthiness of data over its entire lifecycle. Data must not be changed in transit or altered by unauthorized parties. Such measures include implementing user access and versioning controls to prevent erroneous changes or accidental deletion by authorized users. Other measures include verifying data integrity through the use of cryptography, physical environment control, administrative control, disaster recovery measures, and so on. Such measures are often expensive and time-consuming, and do not stop all possible data integrity attacks.

What is needed, therefore, is a system for implementing data integrity measures at a level that closely monitors the data itself, and does not overly consume system resources and impose high administrative costs.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
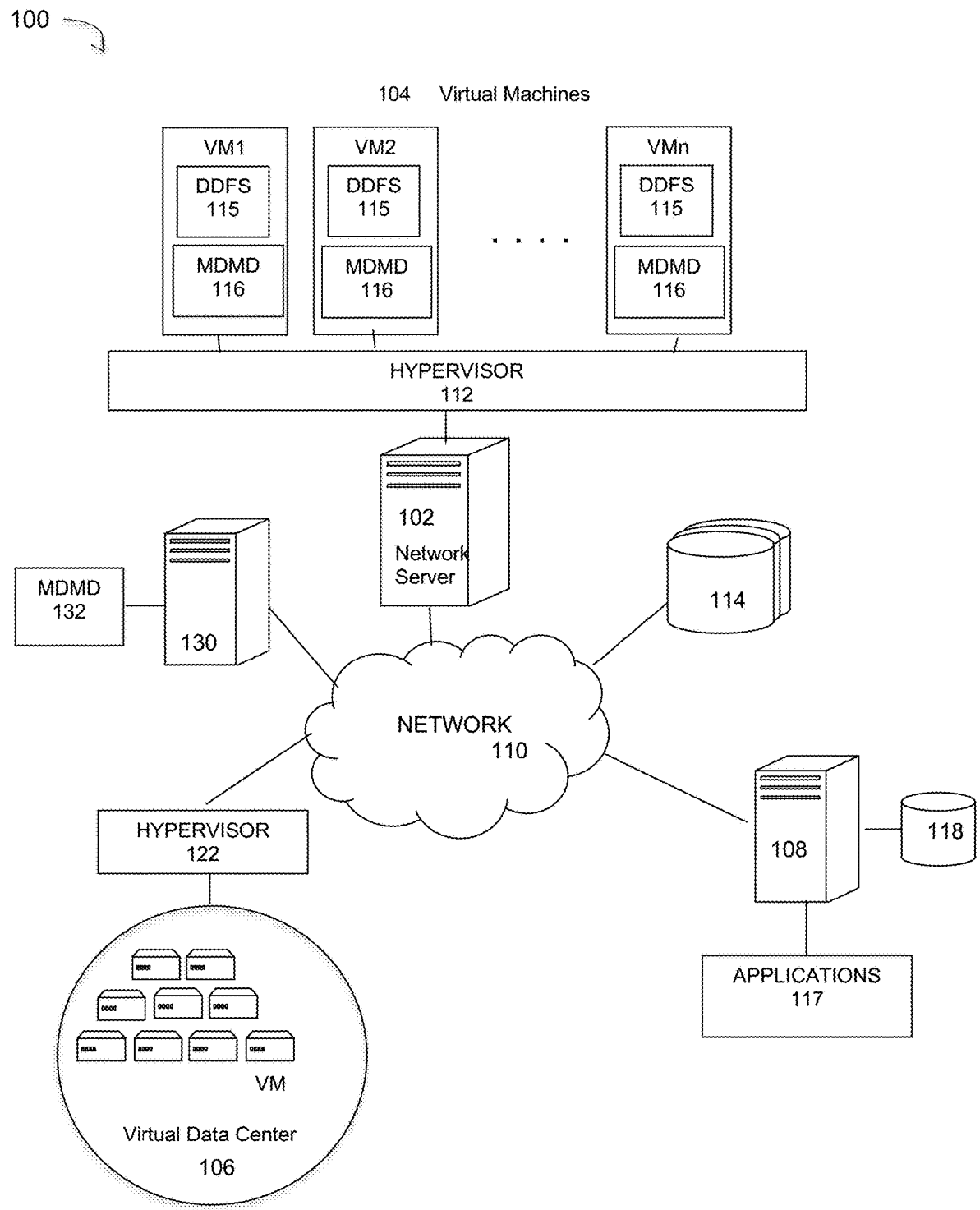
FIG. 1 illustrates a large-scale network implementing a malicious data manipulation detection process, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Some embodiments of the invention involve large-scale IT networks or distributed systems (also referred to as "environments"), such as a cloud network system or very large-scale wide area network (WAN), or metropolitan area network (MAN). However, those skilled in the art will appreciate that embodiments are not so limited, and may include smaller-scale networks, such as LANs (local area networks). Thus, aspects of the one or more embodiments described herein may be implemented on one or more computers in any appropriate scale of network environment, and executing software instructions, and the computers may be networked in a client-server arrangement or similar distributed computer network.

Embodiments include systems and methods that verify data between two network layers that play role in the data input/output (I/O) path, by exchanging information in real time. Certain data elements, referred to as "markers" are written at known locations, and constantly verified to make sure that they are not changed using the data protection or another lower-layer system. Such markers do not have much negative effect on a server's performance and have negligible storage footprint.

Large-scale data networks generally utilize layered software data architecture. The runtime environment of applications today is more than just a computer operating system. Modern datacenters use virtualization, and sometimes multiple levels of virtualization, to improve manageability and efficiency of their workloads. The storage of such applications can be in various forms and formats, from distributed or shared file systems to storage arrays or local disks. Important file systems and storage systems typically also have data protection levels, backing up and replicating the data for business-continuity and disaster recovery use cases.

FIG. 1 is a diagram of a network implementing a malicious data manipulation detection process, under some embodiments. For the embodiment of FIG. 1, network server and client computers are coupled directly or indirectly to one another through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), as is known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application.

Virtualization technology allows computer resources to be expanded and shared through the deployment of multiple instances of operating systems and applications run virtual machines (VMs). A virtual machine network is managed by a hypervisor or virtual machine monitor (VMM) program that creates and runs the virtual machines. The server on which a hypervisor runs one or more virtual machines is the host machine, and each virtual machine is a guest machine. The hypervisor presents the guest operating systems with a virtual operating platform and manages the execution of the guest operating systems. Multiple instances of a variety of operating systems may share the virtualized hardware resources. For example, different operating system (OS) instances (e.g., Linux and Windows) can all run on a single physical computer.

In an embodiment, system 100 illustrates a virtualized network in which network server 102 runs a hypervisor program 112 that supports a number (n) VMs 104. Network server 102 represents a host machine and target VMs (e.g., 104) represent the guest machines. Target VMs may also be organized into one or more virtual data centers 106 representing a physical or virtual network of many virtual machines (VMs), such as on the order of thousands of VMs each. These data centers may be supported by their own servers and hypervisors 122.

The data sourced within the network by or for use by the target VMs may be any appropriate data, such as database data that is part of a database management system. In this case, the data may reside on one or more hard drives (118 and/or 114) and may be stored in the database in a variety of formats (e.g., XML or RDMS). For example, one computer may represent a database server that instantiates a program that interacts with the database. One or more other servers 108 may also run any appropriate application program 117 that creates, processes, or ingests data within system 100, and an operator of such a server computer may be referred to as a "user."

The data generated or sourced in system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity drive (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

Network 100 of FIG. 1 may implement an enterprise data protection system that implements data backup processes using storage protection devices, though embodiments are not so limited. Each VM may run its own application, which in an example embodiment is shown as a Data Domain File System (DDFS) for a deduplication backup application. Each VM also runs a malicious data modification detection (MDMD) process 116 to detect instances of potential malicious data modification, as described in greater detail below. It should be noted, however, that embodiments are not so limited and at least a portion of the MDMD 116 or DDFS 115 functions may be executed or supported by components other than the VMs themselves, such as by a separate server 130 executing malicious data modification detection process 132. For sake of description however, the MDMD and DDFS functions are illustrated and explained as being executed within each VM, as shown. Similarly, an application or DDFS 115 may be described as being a singular process, but should be understood to represent respective processes running inside each VM 104 or even VMs in data center 106, depending on the system configuration.

Although embodiments are described and illustrated with respect to certain example implementations, platforms, and applications, it should be noted that embodiments are not so limited, and any appropriate network supporting or executing any application may utilize aspects of the machine learning process for fast forward advance as described herein. Furthermore, network environment 100 may be of any practical scale depending on the number of devices, components, interfaces, etc. as represented by the server/clients and other elements of the network.

Figure 2:
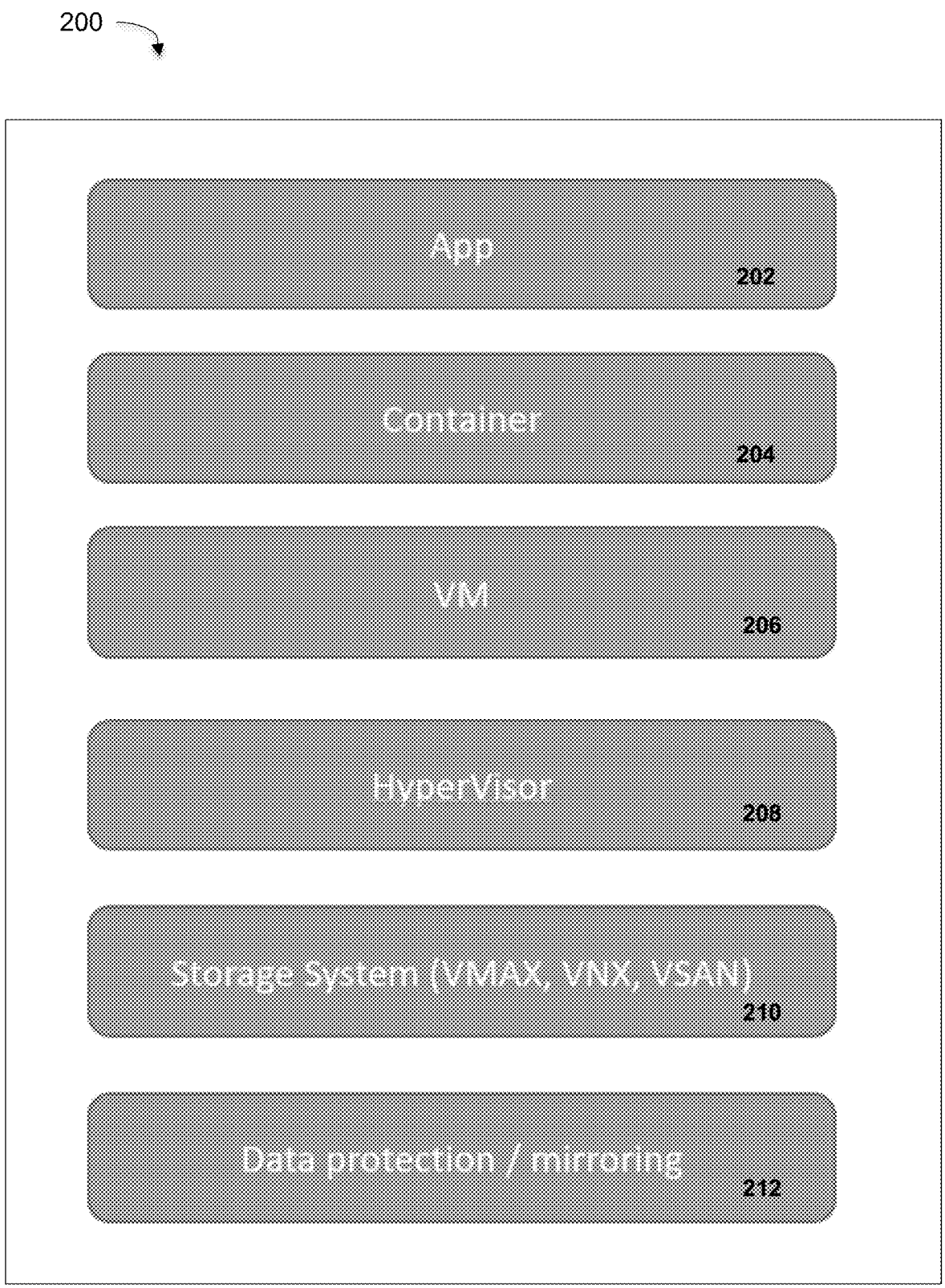
FIG. 2 illustrates a combination of runtime environments and storage levels as a list of layers, under an example embodiment.

As stated above, the network 100 implements a layered software architecture. The combination of runtime environments and storage levels, can be seen as a list of layers. Such an example is shown in FIG. 2. The example architecture diagram 200 of FIG. 2 shows six layers, the application itself 202, a container 204, a virtual machine (VM) 206 that serves as the container host, a hypervisor 208 that runs the VM, an underlying storage system 210 (array or software-defined), and its data protection (DP) layer, 212. The example in FIG. 2 can be expanded to include more layers and/or subsystems, such as networking elements in either physical or software-defined networks.

Although most malware, ransomware and viruses are at the OS layer (or container layer) close to the application, there are various attack vectors in the lower layers. Malicious software installed in the hypervisor, for instance, can perform data manipulation or ransomware-like encryption of the underlying data, without the upper application or OS layers discovering it for a significant amount of time (e.g., on the order of many minutes or hours). Reducing the detection time of such attacks can greatly reduce the damage it incurs on a system.

Examples of how malicious software can reach the layers below the application include escaping the container to host VM, escaping the VM to the hypervisor, forming side channels to the storage system or hypervisor, using OS rootkits, and other similar methods.

With respect to escaping the container to host VM, there are many well-known exploits for escaping the container (e.g., Docker) jail. For example, one method (i.e., CVE-2017-5123) can compromise the host and exposing other containers which run on the same host for attacks. Once the host VM is compromised potentially any IO which passes through the host can be tampered, or the storage below can simply be overridden. Similarly, a vulnerability (i.e., CVE-2008-0923) was recently discovered which allows to escape from VM to the hypervisor.

With respect to the side channels, such channels can be used for getting access to the storage system controller or the hypervisor physical server. For example, a BMC controller is a type of embedded computer used to provide out-of-band monitoring for desktop and server computers. Once administrative access to the BMC is obtained, there are a number of methods available that can be used to gain access to the host operating system. The most direct path is to abuse the BMCs KVM (kernel-based virtual machine) functionality and reboot the host to a root shell (e.g., init=/bin/sh in GRUB) or specify a rescue disk as a virtual CD-ROM and boot to that. Once raw access to the host's disk is obtained, it is trivial to introduce a backdoor, copy data from the hard drive, encrypt the data, and other malicious data modifications.

With respect to OS rootkits, these represent another example of malicious code that can run, for example, in the VM or hypervisor layer. Such OS rootkits are typically very difficult to detect for antiviruses inside the OS.

These methods all represent various backdoors in which to reach the backend infrastructure layers, and this list is not at all complete. Other methods, like brute-forcing the password or obtaining physical access to the servers also exist, and pose a real threat to data integrity and protection. Although solutions exist for protection of some of the top layers (e.g., antivirus programs for protecting the VM OS layer), there are presently no comprehensive solutions for detecting malicious code in the layers below.

Embodiments include a process for providing cross verification between layers 200. As mentioned, each of the layers can be compromised by an attacker and bypass the layer protection. Embodiments of the malicious data modification detection process include a cross-layer cooperation process to verify that data was not tamper in other layers. In order to achieve that goal, two layers which are not directly connected are selected. They will collaborate information and verify data integrity. These two layers give a protection service for all the layers between them. Any two layers may be used together. For purposes of description, the data protection layer 212 is often described as being the lower layer, but embodiments are not so limited, and any other layer (except for the application layer) may be the lower layer and work with any other higher level layer.

In an example embodiment of FIG. 2, the container layer 204 can collaborate information with the data protection layer 212 and provide protection for the VM, hypervisor, and storage system layers. Once that this process has detected data tampering, it could generate an alert which can help a system admin or security operations center mitigate the attack.

Each of the layers of FIG. 2 represents a server computer, process, or other component that executes or implements the function of the layer within the overall system 100. For example, with respect to the container layer 204, embodiments of system 100 implement containerization technology, which has been developed as a lightweight alternative to full machine virtualization by encapsulating an application in a container with its own operating environment. Containerization has gained recent prominence with the open-source Docker, in which containers are deployed as portable, self-sufficient containers that can run on everything from physical computers to VMs, bare-metal servers, cloud clusters, and so on. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software. Because resources are shared in this way, application containers can be created that place less strain on the overall resources available.

In an embodiment, the container management layer 204 is implemented as a Kubernetes (or similar) platform, which is an open-source platform for automating deployments, scaling, and operations of application containers across clusters of hosts, providing container-centric infrastructure. In such a system, a cluster consists of at least one cluster master and multiple worker machines called nodes, and the containerized applications all run on top of a cluster.

Figure 3:
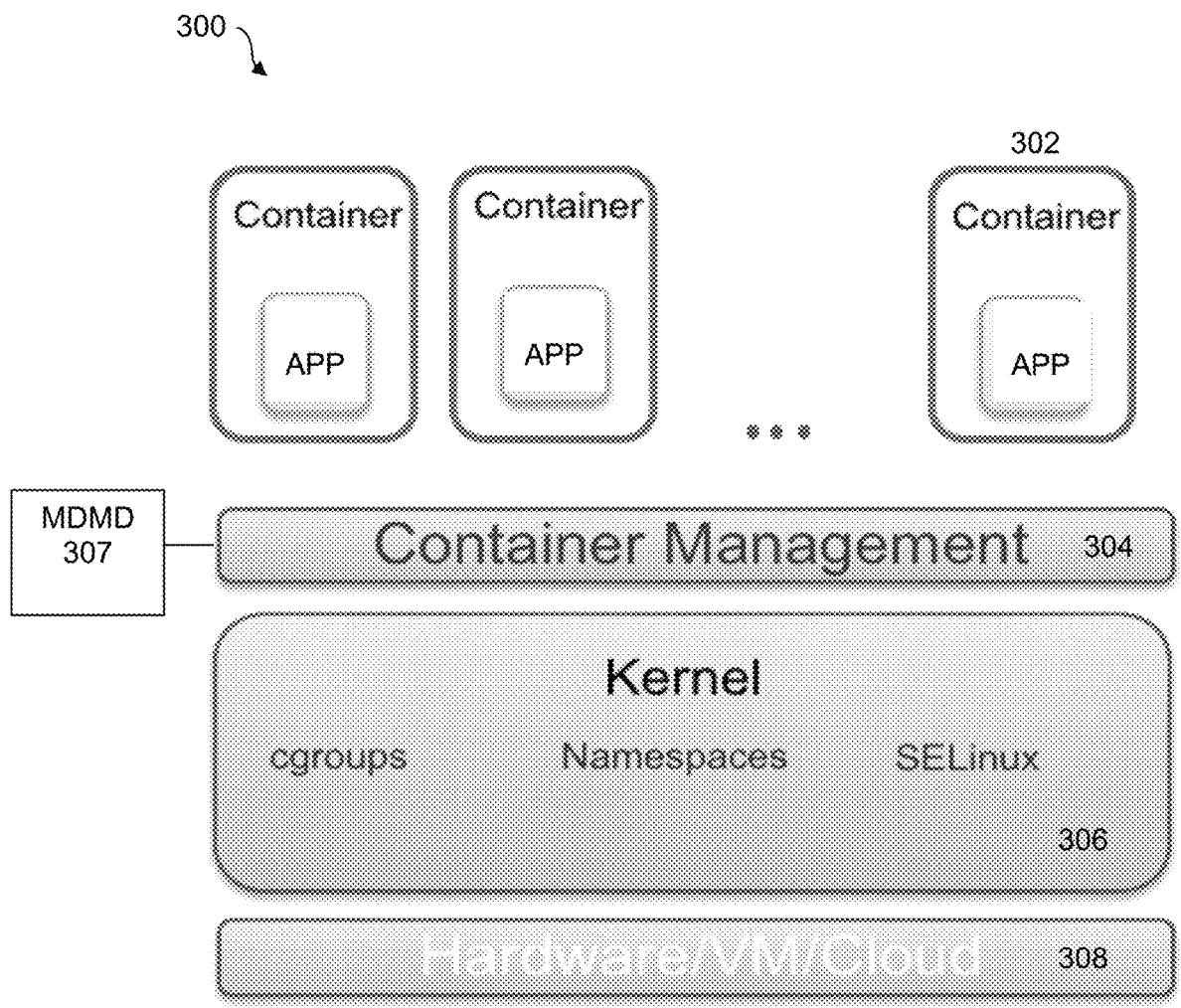
FIG. 3 is a block diagram 300 that illustrates a container platform implementing a malicious data modification detection process, under some embodiments.

FIG. 3 is a block diagram 300 that illustrates a container platform implementing a malicious data modification detection process 307, under some embodiments. System 300 has a number of applications (apps) that are encapsulated in respective containers 302 so that each application operates within its own operating environment. The containers are deployed as portable, self-sufficient data structures that can run any practical hardware platform 308 from VMs, cloud clusters, servers, and so on. The multiple isolated containers are run on a single control host and access a single kernel 306 that provides access to certain kernel features. In an embodiment, system 300 utilizes the Docker container format to abstract the lower layer of container technology, though other similar formats may also be used. An application can run in multiple containers, and usually a container will just run a single micro service. The container management layer 304 is used to automate the creation, destruction, deployment and scaling of the containers 302. It includes a container orchestration process or component that arranges, coordinates and manages the containers For the embodiment of FIG. 3, the container management layer 304 executes or accesses the malicious data modification detection process 307. This allows the container layer to share information and collaborate with other layers, such as the data protection layer 212 and provide protection for the other or intermediate layers. In an embodiment, each of the other layers can also include respective MDMD processes or hooks to the MDMD process 132 to collaborate with any of the other layers. One of the advantages of this approach is that the attacker not exposed to any of this verification process and cannot be influenced on the result. On contrary, from a practical point of view, the lower layer (of the two selected layers) is exposed to a new channel of attack. Thus, the new channel must be protected before adopting the concept.

Figure 4:
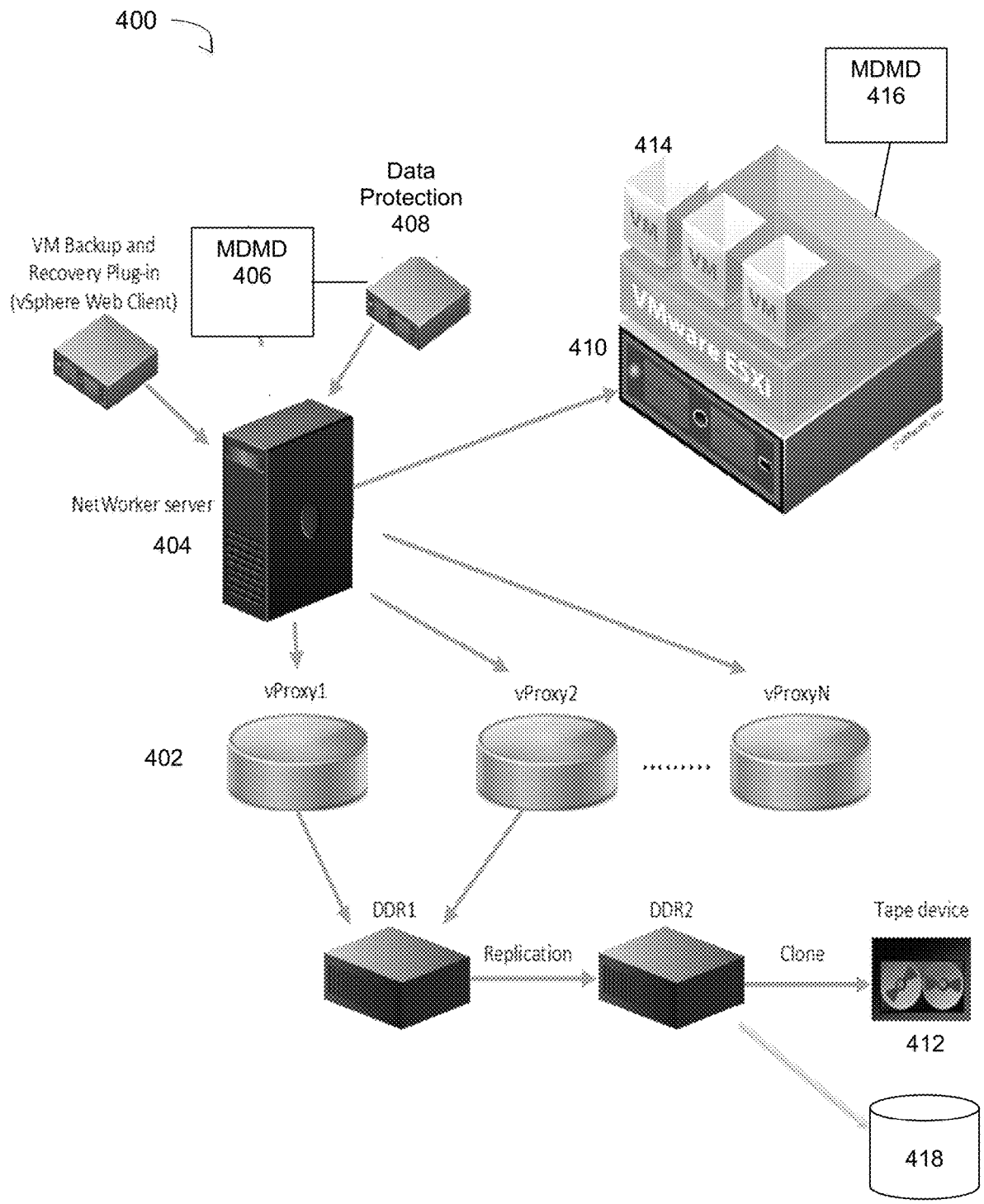
FIG. 4 illustrates a data backup and restore system having a data protection component executing a malicious data modification detection process, under some embodiments

The data protection layer may be embodied as a security or data recovery component, such as in a data backup system. FIG. 4 illustrates a data backup and restore system having a data protection component executing an MDMD process, under some embodiments. FIG. 4 illustrates a specific example case of using vProxy appliances executing a file-level restore (FLR) process through a data protection client, but embodiments are not so limited. Any system having a data protection component or process may be used. For the example system 400 of FIG. 4, the vProxy appliances 402 provide the data movement services between the VMware host 410 and the target protection storage, for example Data Domain. The NetWorker server 404 provides the ability to manage appliances 402, and configure data protection policies for backup and clone operations. It integrates with the data protection component 408 to provide centralized management in a virtual environment. A separate server or server process may be provided to start, stop, and monitor data protection policies and perform recovery operations. The data protection component 408 provides the ability to perform file level recovery, such as by using a web interface for the user, The DDR1 and DDR2 Data Domain appliances receive and clone backup data and tape device 412 or HDD or disk 418 is the storage media that receives backup data. The data protection component 408 running the MDMD 406 process thus implements the data protection/mirroring layer 212 of FIG. 2.

Similarly, the hypervisor layer 208 can be implemented through the hypervisor host 410. For the example embodiment of FIG. 4, server 410 runs the VMware ESXi process that maintains and controls the virtual machines 414, where ESXi is an enterprise-class, type-1 hypervisor for deploying virtual computers. As such, ESXi is not a software application that is installed on an operating system; instead, it includes and integrates vital OS components (e.g., a kernel). Alternatively, any OS hypervisor may also be used. To implement the hypervisor layer 208, server 410 executes or accesses MDMD process 416. Similarly, the VM layer 206 of FIG. 2 may be embodied through VMs 414 of FIG. 4, and the storage system 210 of FIG. 2 may be embodied as the disk (or disk array) 418 or tape drive 412 of FIG. 4.

FIG. 4 is provided as one example of a physical network system that implements or embodies some of the logical layers of FIG. 2, and many other networks, components, processes, and topographies are also possible.

In an embodiment, the process of detecting any data manipulation between the selected two layers uses data elements referred to as "markers" in known locations, and constantly verifies that they are not changed in the selected lowest layer. The first chosen layer (i.e., the "higher layer" or "top layer") is responsible for injecting the markers and saving the locations and other metadata which is require for verification in a shared location referred to as the markers database or "markers DB." The second layer (i.e., the "lower layer") reads the markers location and metadata. Each I/O is scanned and verified against the marker information. In case that the test is failed, i.e., a marker which should not have been changed by a layer in between was indeed changed, an alert is created with the relevant information.

For the layers of FIG. 2, an example hierarchy of layers from the application layer 202 to the data protection layer 212 is shown. Generally, layers that are graphically above other layers are referred to as top layers as compared to the lower layers. Embodiments are not so limited, however, and any order or hierarchy of layers may be used.

Each layer has a driver or other processing component that generates, reads, updates or otherwise processes markers saved to a marker database and used by the other layers. Each layer thus has a driver or similar processing component executed by a system component corresponding to that layer, such as shown in FIGS. 3 and 4.

Figure 5:
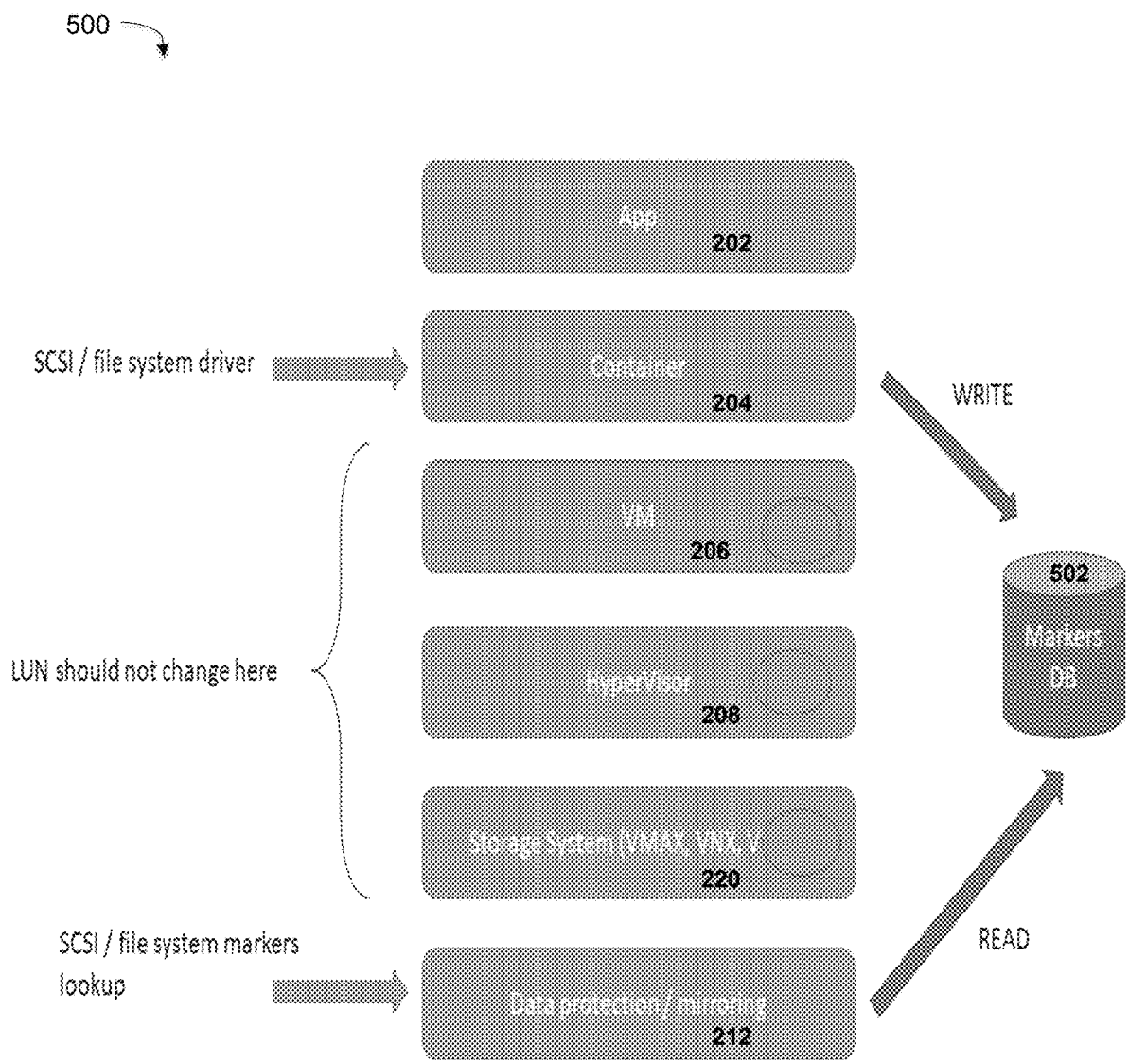
FIG. 5 illustrates protecting layers using markers through a malicious data modification detection process, under some embodiments.

FIG. 5 illustrates protecting layers using markers through a malicious data modification detection process, under some embodiments. For the example of FIG. 5, the malicious data modification process is illustrated as operating between two example selected layers, which are the container layer 204 and the data protection layer 212. It should be noted that embodiments are not so limited and any two layers may be selected.

As shown in FIG. 5, the file system driver running in the container layer 204 is responsible for generating the markers and updating the markers database component 502. When a read or write I/O is created and passed through the layers of VM, hypervisor and storage system and reach the data protection layer 212, the data is verified against the markers.

In an embodiment, each marker is comprised of offset, length and certain marker data. The data could be: (1) pseudo-random such that can be reconstructed from an offset and a known seed; or (2) act as a decoy ("honeypot") and contain synthetic information that might be considered valuable for a possible attacker, depending on the protected application.

The markers can be changed periodically, for example, once per day. The lowest layer can consult with the marker database 502 to understand which markers exist at any point in time. The layer drivers are configured to support changing markers, which is the transition of markers from one location (and content) to another. In typical usage, it is not necessary to write the whole data of the marker in the markers database 502. It is enough to write a hashed value of the marker data.

The marker is stored along with location information and other certain metadata. Table 1 below illustrates the composition of marker data as it is stored in a marker database, under an example embodiment

TABLE 1

| MARKER ID | LOCATION | METADATA | DATA |
|---|---|---|---|
| 001 | XX0 | Offset/Length | AAA |
| 002 | XX1 | Offset/Length | BBB |
| . | . | . | . |
| . | . | . | . |
| . | . | . | . |
| NNN | XXN | Offset/Length | ZZZ |

As shown in Table 1 above, the metadata includes offset and length information, as well as any other relevant information. With regard to the data, the marker database can store the data itself or a hashed value of the data using any appropriate hash function, such as SHA256. The marker data and composition shown above is provided for example only, and many other configurations are also possible.

The markers are each associated with a specific I/O operation as dictated by the location information and stored by the top layer driver. The lower layer driver reads the marker at the appropriate location for the specific I/O operation and the marker that was written is compared to the marker that was read. This comparison step is performed in the lower layer. If the markers match, the marker is verified. If they do not match they are not verified. Non-matching markers mean that the corresponding I/O operations do not match and thus data was manipulated in one or more of the layers between and including the top and lower layers.

Once a changed marker is detected, an event will be triggered to notify the stakeholders (e.g., users, network administrators, other network resources) about the suspected attack or malicious code. Optionally, more drastic actions can be taken, for example the storage system can be locked down in order to avoid further changes. Such actions can depend on the number of changed markers that can be parameterized according to application and confidence in the system.

With respect to verifying against the markers database, consulting the markers database on every I/O operation is generally not practical. In an embodiment, the lower layer component can cache the information from the markers database and periodically check for updates. If the markers update interval is known, the lower layer will take interval in into account. The data (or hash of the data) inside the marker can be taken from the markers database, or it can be generated on the fly by the lower layer, according to the seed written in the markers database.

In certain cases, markers can be hidden. Markers are designed to not interfere with the application. The top chosen layer will hide markers from the layers above. For example, in case of file systems, the markers can be marked as bad sectors or used blocks. The lower layers however will not know of this and will treat the whole volume or virtual volume as one. When using the honeypot method mentioned above, decoy data will be inserted as markers and an attacker below the top layer will not be able to distinguish between real data and the markers, which are hidden from the application (all layers above the chosen top layer).

Advanced replication systems, such as the Dell EMC RecoverPoint for Virtual Machines system, keep track of every I/O going to the volume, for any-point-in-time (PiT) recovery capabilities, and can utilize this flow in order to validate markers. Replication systems sometimes use snapshot-based methods to find the changes written at a specific time interval. They read the changed data from the snapshot and can spot changes to markers at this point. This provides a certain amount of verification during replication flows. Examples of such verification include verification at the storage layer 210, where marker verification can be done at the storage layer with physical array storage, for instance, when handling incoming write I/Os.

In software-defined storage, such as VSAN or ScaleIO, the markers verification can be done while mirroring the I/O to separate hypervisors or storage servers. For extra protection against compromised hypervisors, the verification can be done on multiple hypervisors, such that malicious data-altering code installed on a hypervisor will not be able to cause much damage. That is, changes to markers will be detected and the suspected compromised hypervisor will be quarantined until closely inspected.

In an embodiment, the malicious data modification detection process can be configured with respect to certain operating parameters or characteristics. One such parameter is the number of markers utilized by the layer. In general, the more markers, the greater the overhead of storage, but the higher the chance of finding that someone is changing the data faster. The number of markers can be defined by percentage of overall data. For example, a default condition may be to set 0.1% of the data as markers. This can be modified to much larger numbers if the user is willing to pay for quick detection and the cost of more storage for the markers and CPU processing overhead (per unit time) for tracking them. Note that this parameter can be adaptive, and change over time according to user needs.

The periodicity of checking for markers is another configurable parameter. Examining every I/O operation (read/write), even checking if it fits into the current markers list, can be excessively time and processor overhead consuming, depending on the number of markers and their spread. This resource consumption and potential latency can be controlled by the administrator by choosing to check only a certain percentage of the I/Os. The higher the percentage, the longer it might take to find any change to a marker. Note that this parameter can also adapt over time according to user requirements.

In an embodiment, the process may be configured to use pre-calculated hashes. In specific cases, where the I/Os are aligned to chunk size (e.g. 4 KB) and the lower layer is a storage system like the Dell EMC XtremIO (XIO), the process can take advantage of the hashes the storage keeps for each chunk of data. This, and other modern storage systems, calculate and store hash values for their data chunks so that the malicious data modification detection system will not need to perform the hash function itself. This will greatly reduce the overhead of the lower layer which means it can perform the checking operation on every or nearly every I/O without incurring much overhead.

With respect to application in a data protection system, if the process detects the changes as part of the data protection engine, it can be configured to find the exact point in time in which the data was altered. This can help in forensics when searching for the culprit code or module. Also, as part of the alarm triggering, the data protection system can also notify the user of the latest snapshot or image that does not contain the changes, thus assisting in reducing the time to recover from the problem.

Figure 6:
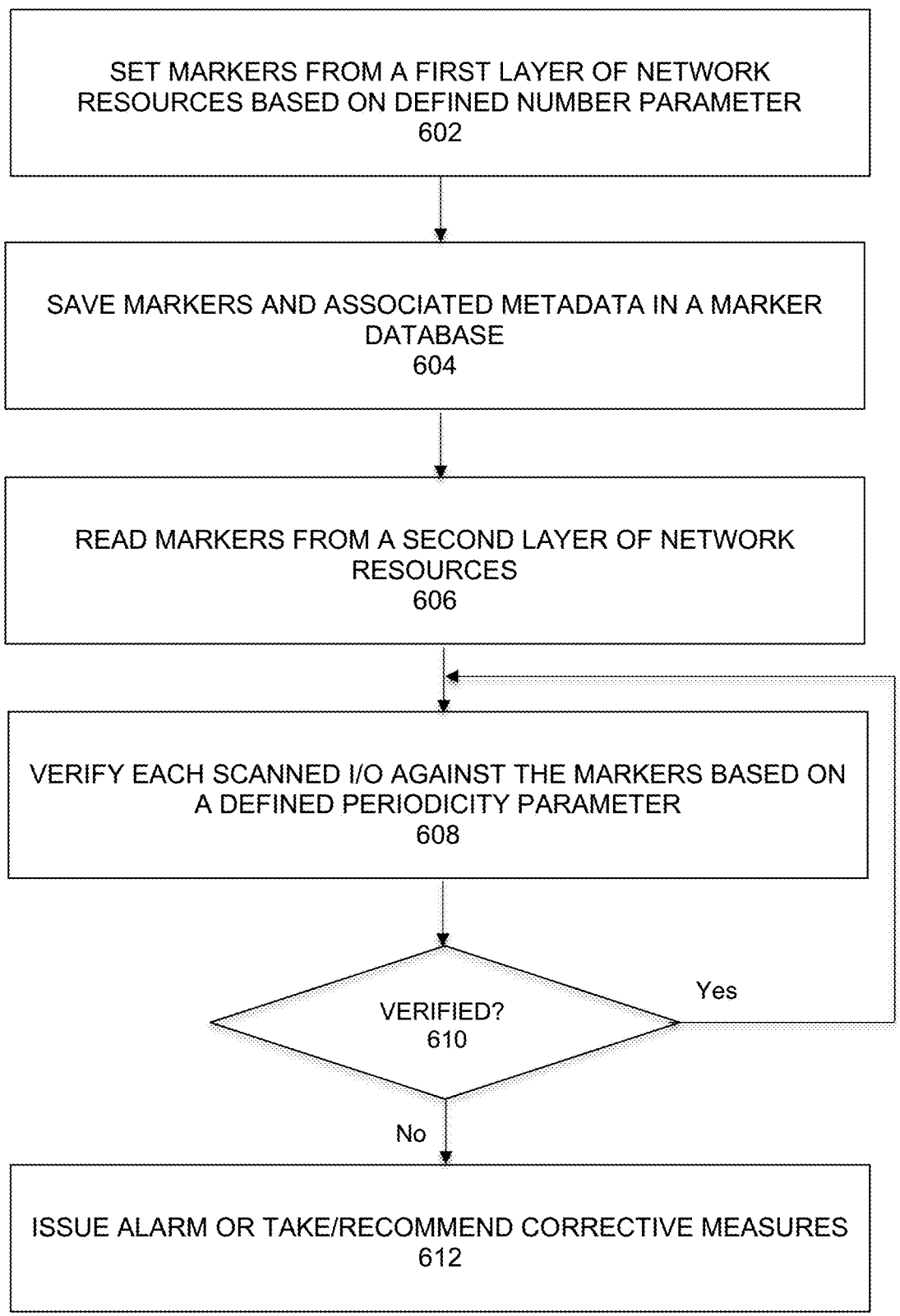
FIG. 6 is a flowchart illustrating a malicious data modification detection process using defined markers, under some embodiments.

FIG. 6 is a flowchart illustrating a malicious data modification detection process using defined markers, under some embodiments. The process of FIG. 6 begins with a first layer of network resources (e.g., the container layer) setting a number of markers associated with I/O operations, where the number of markers may be defined by a set parameter, 602. The markers, location, and associated metadata are saved in a marker database, 604. The markers are associated with specific I/O operations or sets of I/O operations so that they can be verified independently by other layers. In step 606, the markers corresponding to relevant I/O operations are read by a second layer of the network resources (e.g., data protection layer). This layer verifies each scanned I/O against the corresponding marker, 608. In some cases, every I/O may be scanned, but typically, a percentage or sample of I/Os will be selected based on a defined periodicity parameter. In decision block 610, it is determined whether or not the marker for an I/O is verified. If so, the process continues with the verification step for a next I/O, 608. If the marker is not verified, a fault condition exists and the process can either issue an alarm, take corrective measure, recommend corrective measures, or any combination or other remedial action, 612.

Embodiments of the malicious data modification detection process include a new automatic technique which detects malicious data changes including hypervisor-level and storage-level ransomware. It improves forensics abilities by finding the time frame and data location of the malicious activity, and can provide recommendations of a snapshot backup on which to recover.

System Implementation

Figure 7:
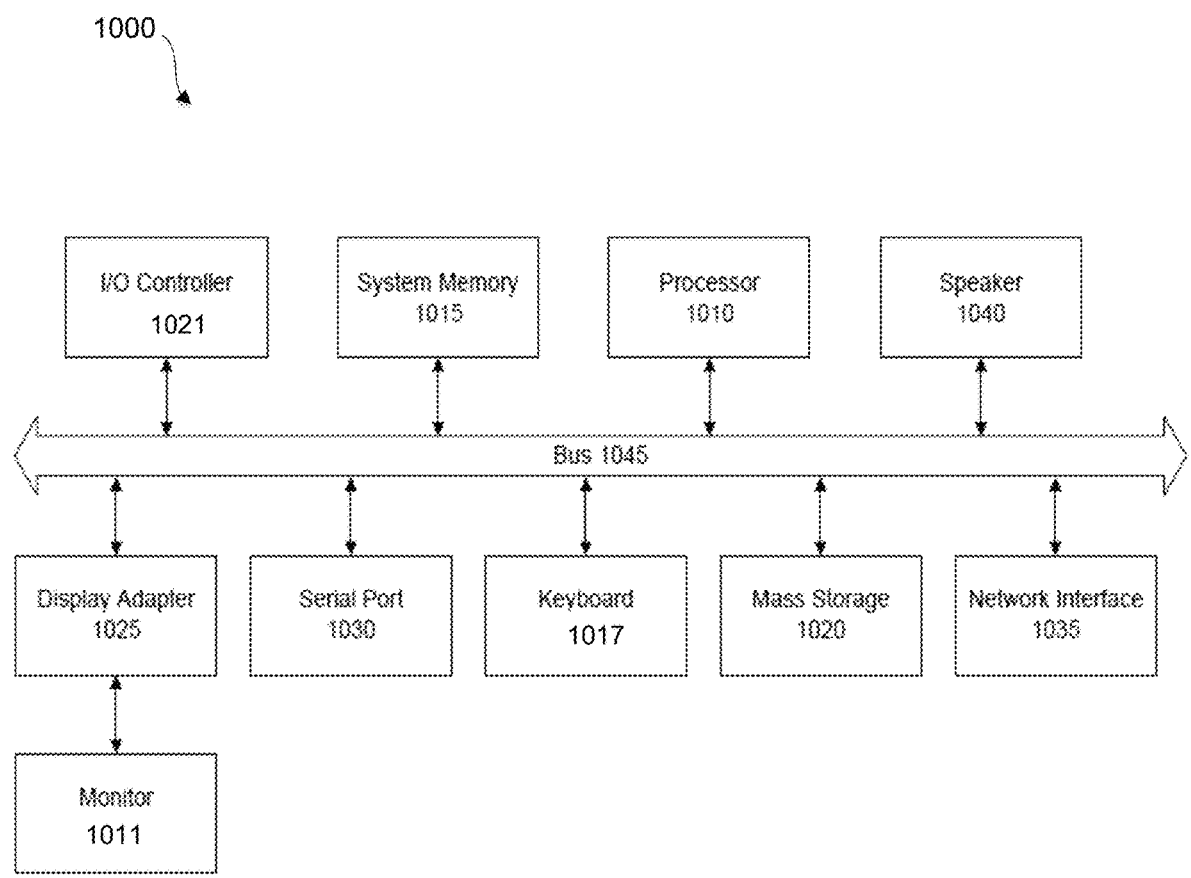
FIG. 7 is a block diagram of a computer system used to execute one or more software components of malicious data manipulation detection process, under some embodiments.

As described above, in an embodiment, system 100 includes a malicious data modification detection module 132 and/or 116 that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein. FIG. 7 is a block diagram of a computer system used to execute one or more software components of a malicious data modification detection process, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 7 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of detecting malicious modification of data in a network, comprising:
    setting, by a first layer of network resources, a number of markers associated with input/output (I/O) operations of the network;
    saving the markers, I/O data location, and associated metadata in a marker database;
    reading, by a second layer of the network resources, the markers corresponding to relevant I/O operations; and
    verifying each scanned I/O operation against a corresponding marker to determine whether or not data for a specific I/O operation has been improperly modified for the first and second layers and any intermediate layer resulting in a fault condition, and if so, taking remedial action to flag or abort the specific I/O operation.

2. The method of claim 1 wherein the resources comprise at least one of:
    applications, containers, virtual machines, hypervisors, storage systems, and data protection components of the network.

3. The method of claim 1 wherein the number of markers may be defined by a set parameter, and wherein a number of scanned I/O operations comprises a percentage of all I/O operations based on a defined periodicity parameter.

4. The method of claim 1 wherein the remedial action comprises one of: issuing an alarm, take corrective measure, recommend corrective measures, or any combination or other remedial action.

5. The method of claim 1 wherein each marker of the markers comprises an offset and length as metadata and certain marker data.

6. The method of claim 5 wherein the data of the markers comprises a hash of the data for the specific I/O operation.

7. The method of claim 5 wherein the marker data comprises a pseudo-random value that can be reconstructed from an offset value and a known seed.

8. The method of claim 7 wherein the marker data comprises a decoy containing synthetic information that might be considered valuable for a possible attacker, depending on the protected application.

9. The method of claim 1 wherein the network comprises part of a data replication system using snapshot-based backups, and wherein changes between each scanned I/O operation and the corresponding marker are made using the snapshot backups.

10. An apparatus detecting malicious modification of data in a network, comprising:
    a first driver for a first layer of network resources, setting a number of markers associated with input/output (I/O) operations of the network, and saving the markers, location, and associated metadata in a marker database;
    a second driver of a second layer of the network resources, reading the markers corresponding to relevant I/O operations; and
    a comparator verifying each scanned I/O operation against a corresponding marker to determine whether or not data for a scanned specific I/O operation has been improperly modified for the first and second layers and any intermediate layer resulting in a fault condition, and if so, taking remedial action to flag or abort the specific I/O operation.

11. The apparatus of claim 10 wherein the resources comprise at least one of:
    applications, containers, virtual machines, hypervisors, storage systems, and data protection components of the network.

12. The apparatus of claim 10 wherein the number of markers may be defined by a set parameter.

13. The apparatus of claim 10 wherein a number of scanned I/O operations comprises a percentage of all I/O operations based on a defined periodicity parameter.

14. The apparatus of claim 10 wherein the remedial action comprises one of:
    issuing an alarm, take corrective measure, recommend corrective measures, or any combination or other remedial action.

15. The apparatus of claim 10 wherein each marker comprises an offset, length and certain marker data.

16. The apparatus of claim 15 wherein the marker data comprises a pseudo-random value that can be reconstructed from an offset and a known seed.

17. The apparatus of claim 15 wherein the marker data comprises a decoy containing synthetic information that might be considered valuable for a possible attacker, depending on the protected application.

18. The apparatus of claim 10 wherein the network comprises part of a data replication system using snapshot-based backups, and wherein changes between each scanned I/O operation and the corresponding marker are made using the snapshot backups.

19. A computer program product, comprising a non-transitory computer-readable medium having a computer-readable program code embodied therein, the computer-readable program code adapted to be executed by one or more processors to perform a method of detecting malicious modification of data in a network, by:
    setting, by a first layer of network resources, a number of markers associated with input/output (I/O) operations of the network;
    saving the markers, location, and associated metadata in a marker database;
    reading, by a second layer of the network resources, the markers corresponding to relevant I/O operations; and
    verifying each scanned I/O operation against a corresponding marker to determine whether or not data for a scanned specific I/O operation has been improperly modified for the first and second layers and any intermediate layer resulting in a fault condition, and if so, taking remedial action to flag or abort the specific I/O operation.

20. The computer program product of claim 19 wherein the resources comprise at least one of: applications, containers, virtual machines, hypervisors, storage systems, and data protection components of the network.

* * * * *